Patented July 22, 1941

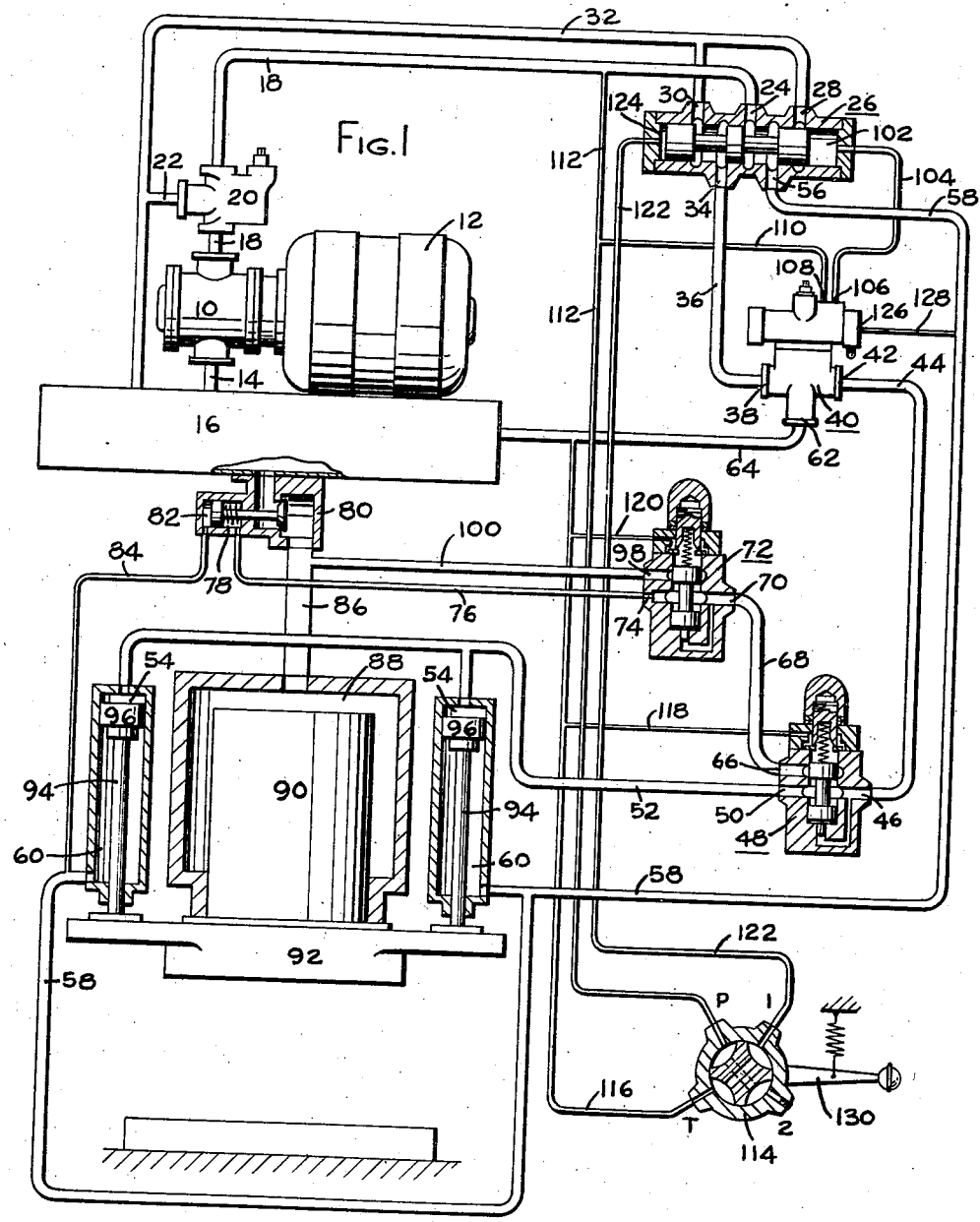

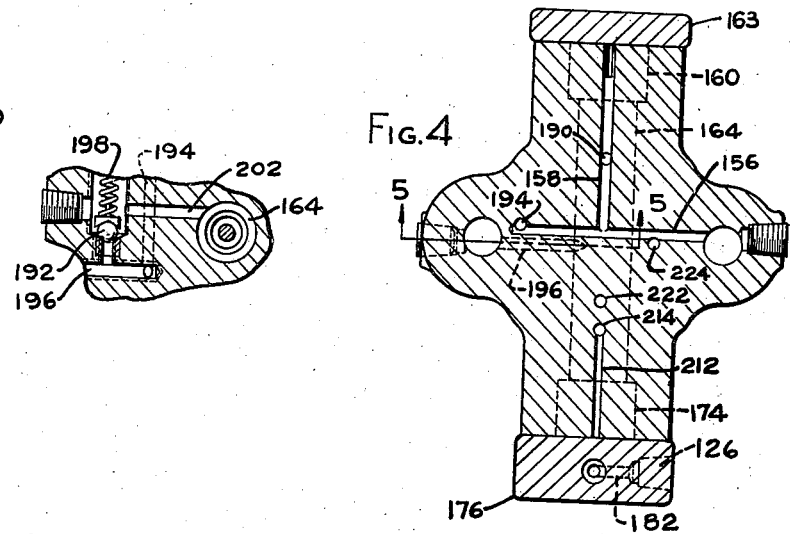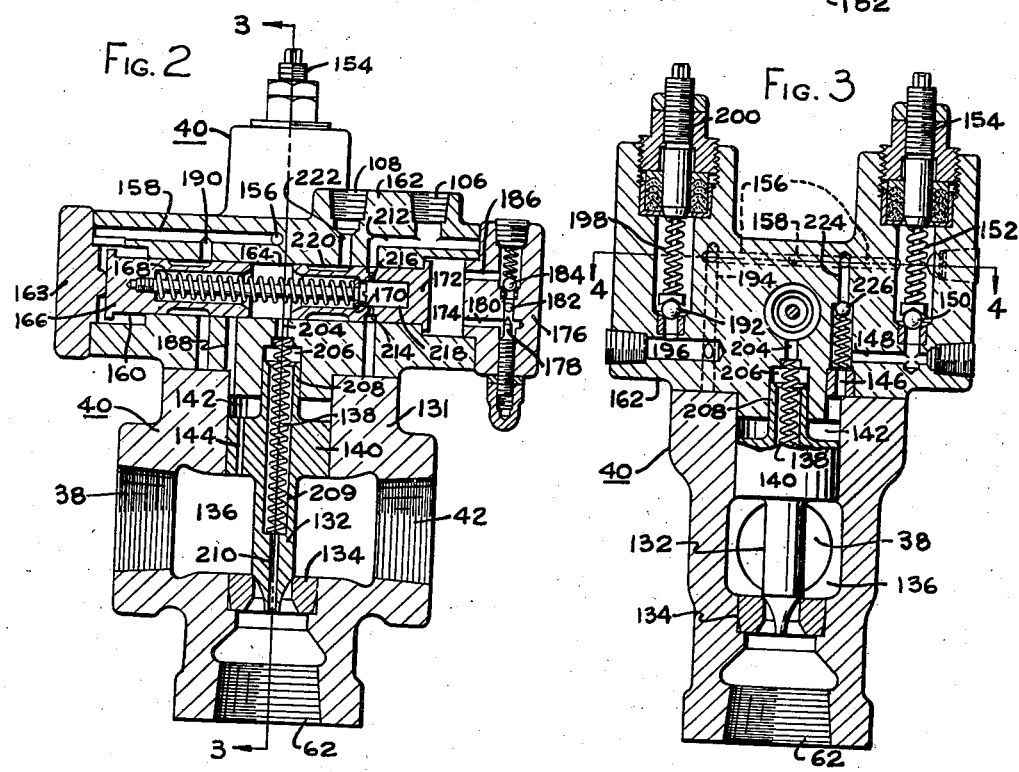

UNITED STATES PATENT OFFICE 2,250,389

POWER TRANSMISSION

Raymond S. Miller, Detroit, Mich., assignor to Vickers Incorporated, Detroit, Mich., a corporation of Michigan Application February 19, 1940, Serial No. 319,600

6 Claims. (Cl. 60—52)

This invention relates to power transmissions, particularly to those of the type comprising two or more fluid pressure energy translating devices one of which may function as a pump and another as a fluid motor.

The invention is particularly concerned with a power transmission system for operating a press or the like and which is adapted to provide a special operating cycle in which the press ram or other motor moves in an advancing direction until a predetermined high pressure is reached at which time a predetermined lower pressure will be maintained on the work for a predetermined interval before returning the press ram or other hydraulic motor.

A further object is to provide an improved pressure limiting valve for use in a hydraulic power transmission system of the character described.

Further objects and advantages of the present invention will be apparent from the following description, reference being had to the accompanying drawings wherein a preferred form of the present invention is clearly shown.

In the drawings:

Figure 1 is a diagrammatic view of a power transmission system incorporating a preferred form of the present invention.

Figure 2 is a longitudinal cross section of a special pressure limiting valve forming part of the circuit in Figure 1.

Figure 3 is a longitudinal section taken on line 3—3 of Figure 2.

Figure 4 is a transverse section taken on line 4—4 of Figure 3.

Figure 5 is a fragmentary sectional view taken on the line 5—5 of Figure 4.

Referring now to Figure 1, there is illustrated a conventional source of pressure fluid comprising a fixed displacement pump 10 adapted to be driven by an electric motor 12. The pump 10 has a suction conduit 14 through which oil is withdrawn from a tank 16 and pumped into a delivery conduit 18. The latter has a relief valve 20 of any suitable construction adapted to by-pass oil to the tank through a conduit 22 whenever a predetermined pressure is exceeded in the delivery conduit 18.

The conduit 18 leads to the pressure port 24 of a pilot-operated four-way valve 26. The latter has tank ports 28 and 30 which connect to the tank 16 by a conduit 32. The motor port 34 of valve 26 connects by a conduit 36 with a port 38 of a combined pressure limiting and pilot control valve 40. From a second port 42 of the valve 40 a conduit 44 extends to a port 46 of a pressure-operated sequence valve 48. A second port 50 of the valve 48 connects by a conduit 52 with the booster cylinders 54 of a hydraulic press. From the other cylinder port 56 of valve 26 a conduit 58 extends to the pull-back cylinders 60 of the press. The valve 40 has a third port 62 which connects by a conduit 64 with the tank 16. The valve 48 has a third port 66 which connects by a conduit 68 with a port 70 of a pressure-operated sequence valve 72 which may be similar to the valve 48. A second port 74 of valve 72 communicates by a conduit 76 with the closing cylinder 78 of a prefill check valve 80 which may be of conventional construction. An opening cylinder 82 of the latter connects by a conduit 84 with the conduit 58 and the pull-back cylinders 60. The prefill check valve 80 controls communication between the tank 16 and a conduit 86 leading to the main cylinder 88 of the hydraulic press. The latter has a ram 90 which carries the press platen 92 reciprocable in the usual slide ways, not shown. The platen also connects by rods 94 with pistons 96 which separate the booster cylinders 54 from the pull-back cylinders 60. The sequence valve 72 has a third port 98 which connects by a conduit 100 with the conduit 86 leading to the main cylinder 88.

The righthand pilot operating chamber 102 of the valve 26 communicates by a conduit 104 with a port 106 in the upper part of the valve 40. An adjacent port 108 communicates by a conduit 110 with a branch conduit 112 leading from the delivery line 18. The branch conduit 112 extends to the pressure port P of a rotary three-way pilot valve 114. The tank port T of valve 114 connects by a conduit 116 with the tank conduit 64, branches 118 and 120 serving to drain seepage from the end chambers of sequence valves 48 and 72. Port 2 of valve 114 is plugged while port 1 connects by a conduit 122 with a lefthand operating chamber 124 of valve 26. A port 126 at the upper part of valve 40 is connected by a branch conduit 128 with the pull-back cylinder conduit 58. Each of the valves thus far described with the exception of valve 40 is of well-known construction so that a brief description of each will suffice to identify them to those skilled in the art.

Valve 26 is of the type which, when once shifted by pilot pressure to either its righthand or lefthand position, remains in that position until shifted again by pilot pressure. Suitable detent means, not shown, may be provided for this purpose. When pilot pressure is admitted to the lefthand operating chamber 124, the spool shifts to the right connecting pressure port 24 to motor port 34 and connecting motor port 56 to tank port 28. When pilot pressure is admitted to the righthand operating chamber 102, the spool shifts to the left transposing the pressure and tank connections with respect to the motor port connections as is shown in Figure 1. Pilot valve 114 serves to alternately connect the port 1 either with the tank port T in the position illustrated or with the pressure port P when the operating handle 130 has been shifted clockwise forty-five degrees.

Valves 48 and 72 are always open to flow in either direction between ports 46 and 50 or ports 70 and 74 respectively. When a predetermined pressure is exceeded in these ports the valve spool lifts to open wide a connection to the third port 66 and 98 respectively. The setting of these valves is such that a slightly higher pressure is required to open valve 72 than to open valve 46. The prefill valve 80 acts as a check valve to admit oil freely from the tank to the main cyclinder when no pressure exists in either chamber 78 or 82. When closed by pressure in chamber 78, no flow in either direction can take place, and when opened by pressure in chamber 82, reverse flow can take place from the main cylinder to the tank.

Before describing the detailed construction of the valve 40, its general function will be described together with the operation of the entire system shown in Figure 1. One function of valve 40 is to act as a relief valve to limit the pressure in conduits 36 and 44 (which are always in communication) by dumping excess oil to tank through port 62 and conduit 64. In so doing the valve 40 operates first as a high pressure limiting valve and then, when this pressure has been reached, immediately changes so as to act as a lower pressure limiting valve. In other words, the valve 40 does not open to port 62 until a predetermined high pressure has been reached, but as soon as this pressure has been reached the valve thereafter maintains a predetermined lower pressure on the oil in ports 38 and 42. The valve 40 also acts as a pilot controlling valve for determining the supply of pressure or exhaust to and from the pilot operating chamber 102 of valve 26. Its action in this respect is likewise controlled in response to the building up of the predetermined high pressure with the additional function of providing a time delayed action. In other words, a predetermined interval after the high pressure has been reached valve 40 admits pilot pressure from port 108 to port 106. Port 106 is cut off from the pilot pressure and connected to exhaust whenever pressure is admitted to the port 126.

In operation, with the motor 12 driving the pump 10 and with the valve 26 in the lefthand position illustrated, oil is withdrawn from the tank 16 through suction conduit 14 and delivered through conduit 18, through ports 24 and 56 of valve 26, and conduit 58 to the pull-back cylinders 60. Since the platen 92 is in its upper position the oil cannot flow into pull-back cylinders 60 so that the entire pump delivery must escape through the relief valve 20. Ordinarily this valve is set to open at a pressure slightly higher than that at which valve 40 opens.

To start a pressing cycle, the handle 130 is moved clockwise admitting pilot pressure to port 1, conduit 122 and operating chamber 124. The valve 26 accordingly shifts to the right admitting pressure oil to pipe 36 where it flows through valve 40, conduit 44, valve 48 and conduit 52 to the booster cylinders 54. The platen accordingly descends, prefill valve 80 opening as a check valve to permit free flow from the tank 16 through conduit 86 to the main cylinder 88. Oil discharged from the pull-back cylinders 60 returns to tank through conduit 58, ports 56 and 28 and conduit 32.

As the platen meets the work, pressure builds up in the booster cylinders 54 and is transmitted back through conduit 52 to valve 48 causing the latter to open admitting pressure oil also through port 66, pipe 68, valve 72 and conduit 76 to the closing chamber 78 of the prefill check valve 80. As soon as the latter closes, pressure continues to build up, opening valve 72 and admitting pressure oil to conduit 100 and 86 where it is effective in the main cylinder 88. The press continues to advance at a slower rate, and as the resistance imposed by the work increases, the pressure in the pump delivery line increases. When this reaches a predetermined value, valve 40 will open bypassing the pump delivery to tank through conduit 64 at this point.

Immediately thereafter the internal mechanism of the valve shifts so as to effect this bypassing at a lower pressure. There is also set in motion a time delay mechanism which is effective a predetermined time after the peak pressure occurs to connect ports 106 and 108 thereby admitting pilot pressure through conduits 110 and 104 to the pilot operating chamber 102. The valve 26 is accordingly shifted to the left thus connecting the pump delivery to port 56 where it is delivered through conduit 58 to the pull-back chambers 60. The platen accordingly ascends discharging oil from the booster cylinders 54 through conduits 52, 44 and 36, ports 34 and 30, and conduit 32 to tank. Pressure oil in conduit 58 is also transmitted through branch conduit 84 to the opening chamber 82 of prefill valve 80 thus opening a free path for return of oil from the cylinder 88 to tank.

Referring now to Figures 2 through 5, the internal construction of the valve 40 is there illustrated. As will be seen from Figure 2, the lower part 131 of the body is formed in the shape of a pipe T in which the three ports 38, 42 and 62 are located. A conical valve 132 cooperates with a seat 134 to normally close off a chamber 136, which connects ports 38 and 42, from communication with the port 62. Valve 132 is biased to closed position by a spring 138 and has a piston 140 slidable in a chamber 142 whereby the valve may be operated by fluid pressure. A restricted passage 144 connects the chamber 142 with the chamber 136 so that at all times when there is no flow out of the chamber 142 the pressure therein will be the same as the pressure in chamber 136. The chamber 142 communicates through passages 146 and 148 (Figure 3) with a pilot relief valve 150 which in the form shown consists of a spring-loaded ball valve, the spring 152 of which is adjustable by means of an abutment screw 154. The setting of the spring 152 determines the value of the high pressure at which the valve 132 opens. In its operation it is similar to that of the relief valve disclosed in the patent to Harry F. Vickers, 2,043,453.

The exhaust side of the valve 150, however, is not connected to tank as is the case with the valve in the aforementioned patent but communicates through passages 156 and 158 with a chamber 160 formed in the righthand end of a cap member 162 which forms the upper part of the main body of the valve 40. This chamber 160 is closed by an end cap 163. Slidably mounted in a bore 164, and projecting into the chamber 160 is a valve spool 166 normally biased to the left by a spring 168. The latter abuts against a shoulder 170 formed on a second slidable spool 172 which is also mounted in the bore 164 and projects into a chamber 174 in the righthand end of the cap member 162. The construction is such that the two spools 166 and 172 are freely slidable as a unit in the bore 164 without compressing spring 168. If one spool meets resistance to movement, the other spool may be moved toward the one spool by compression of the spring 168.

An end cap 176 closes the chamber 174 and contains an adjustable needle valve 178 which controls the rate at which fluid may be exhausted from chamber 174 through passages 180 and 182, the latter leading to the port 126. When pressure oil is admitted to port 126 the latter may flow freely to the chamber 174 through passage 182, a check valve 184 and a passage 186. Thus when the port 126 is connected to tank, that is, during the downward stroke of the press when conduits 58 and 128 are connected to the tank conduit 32, pressure exhausting from the pilot relief valve 150 and entering the chamber 160 will push the valve spool 166 to the right in Figure 2 and will also tend to push the valve spool 172 to the right. The rate at which the valve spool 172 can move, however, is determined by the setting of the needle valve 178 which permits oil to exhaust from chamber 174 only at a reduced rate. Thus the spool 166 can move immediately through its full stroke compressing spring 168 which urges the spool 172 to the right as fast as the rate of exhaust from chamber 174 will permit.

The valve spool 166 in its normal position, shown, blocks communication between a passage 188 leading to chamber 142 and a passage 190 communicating with the passage 158. When the spool 166 shifts to the right, connection is established between these passages. This permits the pressure in chamber 142 to be transmitted directly to the chamber 160 regardless of the opening of valve 150. It also connects the chamber 142 to a low pressure pilot relief valve 192 (Figure 3). For this purpose the passage 156 is extended to the left beyond the passage 158 in Figures 3 and 4 and connects by passages 194 and 196 with the relief valve 192. The latter is also formed as a spring-loaded ball valve, the spring 198 of which is adjustable by an abutment screw 200 and is adjusted to open at a lower pressure than the valve 150. The exhaust from valve 192 passes through a passage 202 (Figure 5) which intersects the bore 164 at its center point. The center of the bore is also in communication with tank through a passage 204 (Figure 2) which communicates with a cylindrical chamber 206 in which a pilot extension 208 of the valve 132 is slidable. The diameter of the extension 208 is preferably the same as the effective diameter of the seat 134. The valve 132 is provided with a central bore 209 having a small extension 210 which leads to the chamber at the lower side of the seat 134 which is always in communication with tank through conduit 64.

The valve spool 172 in its normal position, illustrated, connects the port 106 through a passage 212 in the body 162 and through an annular groove 214, radial holes 216 and central bore 218 in the spool 172, with the central portion of bore 164 which is in communication with the tank as was just described. When the spool 172 is shifted to the right, an annular groove 220 connects passage 212 to a passage 222 leading to port 108 and cuts off communication between passage 212 and tank.

It will thus be seen that as a prerequisite to any change in position of any of the parts in valve 40 from the position illustrated in Figures 2 through 4, the pressure in chamber 136 must rise to a value sufficient to open valve 150. When this pressure is reached the latter valve will open exhausting oil from the chamber 142 at a rate faster than it can be admitted through restricted passage 144 thus setting up a pressure difference between chambers 142 and 136 causing the piston 140 to lift against the bias of spring 138. The oil exhausted from valve 150 flows through passages 156 and 158 to the chamber 160, immediately shifting the spool 166 which compresses spring 168 and biases the spool 172 to the right. This shifting of spool 166 connects chamber 142 through passages 188, 190 and 158 to the chamber 160 thus maintaining pressure thereon, and also connects chamber 142 through passages 156, 194 and 196 to the low pressure relief valve 192. Thus the oil in chamber 142 is permitted to exhaust more easily through the valve 192, passage 202, bore 164, passages 204, 206 and 210 to tank. Piston 140 accordingly lifts higher until the valve 132 reaches a position where the full pump delivery may be exhausted therethrough at a pressure equal to the setting of valve 192 plus the bias of spring 138 applied to the area of the piston 140.

The compression of spring 168, at the same time, starts the spool 172 moving to the right at a speed determined by the setting of needle valve 178. When this rightward travel of spool 172 is completed, port 106 is cut off from tank communication and connected to port 108 through passages 212, 220 and 222. Thus pilot pressure may be admitted from port 108 to port 106 shifting the valve 26. When the valve 26 is shifted, port 126 now becomes connected to the main pump delivery line thereby admitting pressure oil through passage 182, check valve 184 and passage 186 to the chamber 174. The spool 172 is accordingly shifted to the left. Spool 166 is now free to move to the left by discharging oil through passages 158 and 156 and through a branch passage 224 (Figure 3) and a check valve 226 which leads to the passage 146 and chamber 142. Since the chamber 136 is now at tank pressure, this oil may exhaust from chamber 142 through the restricted passage 144 thus permitting spool 166 to return to the position illustrated. The connection of port 106 to tank by spool 172 (through 216, 204 and 210) does not effect shifting of valve 26 because, at the time, no pilot pressure is available at the chamber 124 to accomplish such shifting. This is not made available until the operator, after the completion of the return stroke of the press, again shifts the starting handle 130 to cause another cycle of press operation.

While the form of embodiment of the invention as herein disclosed constitutes a preferred form, it is to be understood that other forms

What is claimed is as follows:

1. In a hydraulic power transmission system for operating a press or the like the combination of a hydraulic motor, pump means for supplying fluid under pressure to operate the motor, directional control means for directing the pump delivery to operate the motor in an advancing or in a returning direction, means for limiting the pressure in the motor advancing conduit to a predetermined high value, a second means, normally ineffective, for limiting the pressure in the motor advancing conduit to a predetermined low value, means operated when the pressure in the motor advancing conduit reaches said high value for rendering the second pressure limiting means effective, and time delay means started concurrently with operation of the last-named means for shifting the directional control means to return the motor.

2. In a hydraulic power transmission system for operating a press or the like the combination of a hydraulic motor, pump means for supplying fluid under pressure to operate the motor, directional control means for directing the pump delivery to operate the motor in an advancing or in a returning direction, means, normally ineffective, for limiting the pressure in the motor advancing conduit to a predetermined low value, means operated when the pressure in the motor advancing conduit reaches a predetermined high value for rendering the pressure limiting means effective, and time delay means started concurrently with operation of the last-named means for shifting the directional control means to return the motor.

3. In a hydraulic power transmission system for operating a press or the like the combination of a hydraulic motor, pump means for supplying fluid under pressure to operate the motor, directional control means for directing the pump delivery to operate the motor in an advancing or in a returning direction, means, normally ineffective, for limiting the pressure in the motor advancing conduit to a predetermined low value, means operated when the pressure in the motor advancing conduit reaches a predetermined high value for rendering the pressure limiting means effective, and means for limiting the effective operation of the pressure limiting means to a predetermined interval of time.

4. In a hydraulic power transmission system for operating a press or the like the combination of a hydraulic motor, pump means for supplying fluid under pressure to operate the motor, directional control means for directing the pump delivery to operate the motor in an advancing or in a returning direction, means for limiting the pressure in the motor advancing conduit to a predetermined high value, a second means, normally ineffective, for limiting the pressure in the motor advancing conduit to a predetermined low value, each of said pressure limiting means including a pilot relief valve, both of said relief valves being arranged to control a single main relief valve in said motor advancing conduit, and means operated when the pressure in the motor advancing conduit reaches said high value for rendering the second pressure limiting means effective.

5. In a hydraulic power transmission system for operating a press or the like the combination of a hydraulic motor, pump means for supplying fluid under pressure to operate the motor, directional control means for directing the pump delivery to operate the motor in an advancing or in a returning direction, means for limiting the pressure in the motor advancing conduit to a predetermined high value, a second means, normally ineffective, for limiting the pressure in the motor advancing conduit to a predetermined low value, each of said pressure limiting means including a pilot relief valve, both of said relief valves being arranged to control a single main relief valve in said motor advancing conduit, and means operated when the pressure in the motor advancing conduit reaches said high value for rendering the second pressure limiting means effective, said last means including a third pilot valve for controlling communicaton between the second pilot relief valve and the main relief valve.

6. A two-pressure relief valve and pilot controlling valve comprising in combination a pilot-controlled main relief valve, a first pilot relief valve and a second pilot relief valve arranged to open the main relief valve at a predetermined low pressure, means normally rendering the second pilot relief valve ineffective and responsive to opening of the first pilot valve for rendering the second pilot valve effective, a pilot valve, and means responsive to opening of the first relief valve for shifting the pilot valve after a predetermined time interval.

RAYMOND S. MILLER.